United States Patent
Guenard et al.

(10) Patent No.: US 6,855,901 B1
(45) Date of Patent: Feb. 15, 2005

(54) PROCESS AND APPARATUS FOR SPECTROSCOPIC IDENTIFICATION AND SORTING OF BARRIER MATERIALS

(75) Inventors: Robert D. Guenard, Lake Jackson, TX (US); Muhammad A. Shafi, Lake Jackson, TX (US); Terry W. Glass, Richwood, TX (US); Mary A. Leugers, Midland, MI (US); Edward J. Sommer, Jr., Nashville, TN (US); John T. Rich, Lebanon, TN (US)

(73) Assignee: National Recovery Technologies, Inc., Nashville, TN (US)

( * ) Notice: Subject to any disclaimer, the term of this patent is extended or adjusted under 35 U.S.C. 154(b) by 115 days.

(21) Appl. No.: 10/126,252

(22) Filed: Apr. 19, 2002

Related U.S. Application Data
(60) Provisional application No. 60/285,479, filed on Apr. 20, 2001.

(51) Int. Cl.$^7$ ................................................ B07C 5/00
(52) U.S. Cl. .................................. 209/577; 250/339.12
(58) Field of Search ................................ 209/577, 576, 209/524; 250/339.12, 339.11

(56) References Cited

U.S. PATENT DOCUMENTS

| | | | |
|---|---|---|---|
| 3,305,528 | A | 2/1967 | Wynstra et al. |
| 4,017,194 | A * | 4/1977 | Conroy et al. ............ 356/239.4 |
| 4,048,141 | A | 9/1977 | Doorakian et al. |
| 4,171,420 | A | 10/1979 | Doorakian et al. |
| 5,089,588 | A | 2/1992 | White et al. |
| 5,134,218 | A | 7/1992 | Brennan et al. |
| 5,134,291 | A | 7/1992 | Ruhl, Jr. et al. |
| 5,141,110 | A | 8/1992 | Trischan et al. |
| 5,143,998 | A | 9/1992 | Brennan et al. |
| 5,149,768 | A | 9/1992 | White et al. |
| 5,164,472 | A | 11/1992 | White et al. |
| 5,260,576 | A | 11/1993 | Sommer, Jr. et al. |
| 5,275,853 | A | 1/1994 | Silvis et al. |
| 5,318,172 | A | 6/1994 | Kenny et al. |
| 5,401,814 | A | 3/1995 | Schomaker et al. |
| 5,489,778 | A | 2/1996 | Burmester et al. |
| 5,502,559 | A | 3/1996 | Powell et al. |
| 5,510,619 | A | 4/1996 | Zachmann et al. |
| 5,615,778 | A | 4/1997 | Kaiser et al. |
| 5,873,470 | A | 2/1999 | Davis et al. |
| 5,966,217 | A * | 10/1999 | Roe et al. .................... 356/402 |
| 6,060,677 | A | 5/2000 | Ulrichsen et al. |
| 6,144,004 | A | 11/2000 | Doak |
| 6,353,197 | B1 * | 3/2002 | Ulrichsen et al. ............ 209/577 |
| 6,610,981 | B2 * | 8/2003 | Sommer, Jr. ............ 250/339.06 |

OTHER PUBLICATIONS

Journal of Polymer Science, vol. 7, 1963, p. 2135.

* cited by examiner

*Primary Examiner*—Donald P. Walsh
*Assistant Examiner*—Joseph C Rodriguez
(74) *Attorney, Agent, or Firm*—Wyatt, Tarrant & Combs, LLP

(57) ABSTRACT

An apparatus and process that makes use of spectral information in the mid-infrared range (400 to 4500 cm$^{-1}$) to identify recyclable materials containing barrier polymers from recyclable materials not containing barrier polymers, which includes projecting light containing the mid-infrared (MIR) range onto materials to be analyzed, dispersing the MIR light that has reflected from or passed through the materials or both into various wavelengths, measuring the intensity of the MIR light at least one wavelength responsive to differences between the materials, measuring the intensity of the MIR light at least one wavelength not responsive to differences between the materials in order to provide a reference, and comparing the measurements in order to identify barrier materials from non-barrier materials.

15 Claims, 2 Drawing Sheets

PROCESS AND APPARATUS FOR SPECTROSCOPIC IDENTIFICATION AND SORTING OF BARRIER MATERIALS

CROSS REFERENCE TO RELATED APPLICATIONS

This application claims priority of U.S. provisional application Ser. No. 60/285,479; filed Apr. 20, 2001.

FIELD OF THE INVENTION

The present invention relates to apparatuses and processes for detecting, analyzing, quantifying and sorting articles by material of construction.

BACKGROUND OF THE INVENTION

The present invention relates to apparatuses and processes for detecting, analyzing, quantifying and sorting articles by material of construction. More particularly, the present invention relates to apparatuses and processes for detecting, analyzing, quantifying and sorting recyclable consumer articles comprising polymeric materials.

Polyester films, especially of polyethylene terephthalate (PET), are today widely employed in the manufacture of consumer articles, such as beverage bottles other food containers, because of their many advantages such as their mechanical properties, their transparency, their nontoxicity, their odorlessness and their tastelessness. However, their gas-barrier properties may limit their use in applications requiring a high protection of the bottled products against the action of external gases, in particular against the action of atmospheric oxygen or, conversely, may not allow the gas composition inside the bottles to be maintained constant.
In order to overcome this disadvantage, it is known to manufacture beverage bottles and other food containers from multilayer structures comprising a layer of PET and a layer of a barrier polymer.

Currently, there are no commercially available detection/analyzing/sorting technologies to differentiate bottles and flakes containing barrier polymers from the rest of the recyclable materials. It is important to detect and separate bottles or flakes containing barrier polymers in order to avoid problems in the end use applications of recycled articles that these barrier polymers may cause if they are in significant quantity, and to recover the barrier polymers for reuse. It is also important to analyze the quality of the feed stream to the recycling plant and that of the clean recycled articles produced by the recycling plant, in order to quantify the amount of barrier polymers.

It would be desirable to provide a process and apparatus that detects the presence of a barrier polymer in recyclable articles such as bottles and flakes. Such a system can be used to (1) sort out bottles containing barrier polymers from bottles that do not contain barrier polymers into one or more bins, (2) sort out flakes containing barrier polymers from flakes that do not contain barrier polymers into one or more bins, and (3) determine the amount of barrier polymers in the flakes or bottles.

It would also be desirable to make use of more than one kind of detector to allow quantification and sorting of multiple materials. For example, the detection systems of this invention can be used along with those for PVC detection systems as described in Provisional Patent Application Ser. No. 60/200,720, filed Apr. 27, 2000, incorporated herein by reference, to make use of the same system to sort out barrier and PVC articles out of recyclable bottles into one or more bins, sort out barrier and PVC flakes out of recyclable flakes into one or more bins, quantify barrier and PVC contamination in the flakes or bottles.

SUMMARY OF THE INVENTION

In a first aspect, the present invention is an apparatus for detecting, analyzing, and sorting recyclable materials that contain barrier polymers such as, for example, polyhydroxyaminoethers (PHAE), ethylene vinyl alcohol (EVOH), poly-xylene-adipamide (MXD6) from those that do not, which comprises an infrared (IR) light source, means for projecting the IR light onto materials to be analyzed, means for dispersing the IR light that has passed through the materials or reflected from the materials or both into various wavelengths, means for measuring the intensity of the IR light at various wavelengths responsive to differences between recyclable materials containing barrier polymers and recyclable materials not containing barrier polymers, means for measuring the intensity of the IR light at various wavelengths not responsive to differences between the two recyclable materials in order to provide a reference, means for acquiring and processing the measurements in order to make determinations of materials types, and means responsive to such determinations for directing materials of different types to different locations or different material collection bins. The apparatus further comprises a logic system which determines the amount of articles containing barrier polymers, and/or logic and sorting systems which sort articles containing barrier materials into one or more bins.

In a second aspect, the present invention is a process for sorting recyclable consumer materials that contain barrier polymers from those that do not, which comprises projecting a beam of IR light from a mid-infrared range (MIR) source which includes radiation at wave numbers within a range between about 2600 and about 3950 $cm^{-1}$ onto recyclable consumer materials, passing a portion of the IR beam reflected from or transmitted through the materials or both through an analytical bandpass filter which passes IR light in a region contained within the range from 2600 to 3700 $cm^{-1}$ wherein the absorption of the IR light is responsive to differences between recyclable materials containing barrier polymers and recyclable materials not containing barrier polymers and through a lens to focus the IR beam to an analytical detector, and passing another portion of the IR beam reflected from or transmitted through the materials or both through a reference bandpass filter where the absorption characteristics of the recyclable materials containing barrier polymers and recyclable materials not containing barrier polymers are substantially the same, such as that between about 3700 $cm^{-1}$ and about 3950 $cm^{-1}$, and through a lens to focus the IR beam to a reference detector, the analytical and reference detectors converting the light intensity to an electrical signal, comparing the signal obtained from the reference detector to the signal from the analytical detector, determining the presence or absence of barrier polymers from the comparison of the signals by sending the electrical signals to a computer processor for data analysis, and directing material of different types to different locations or different material collection bins.

In a third aspect, the present invention is a process for sorting recyclable consumer materials that contain barrier polymers from those that do not, which comprises projecting a beam of IR light from a mid-infrared range (MIR) source which includes radiation at wave numbers within a range between about 3150 and about 3950 $cm^{-1}$ onto recyclable consumer materials, passing a portion of the IR beam reflected from or transmitted through the materials or both through an analytical bandpass filter which passes IR light in a region contained within the range from about 3150 to about 3400 cm$^{-1}$ wherein the absorption of the IR light is responsive to differences between recyclable materials containing barrier polymers and recyclable materials not containing barrier polymers and through a lens to focus the IR beam to an analytical detector, and passing another portion of the IR beam reflected from or transmitted through the materials or both through a reference bandpass filter where the absorption characteristics of the recyclable materials containing barrier polymers and recyclable materials not containing barrier polymers are substantially the same, such as that between 3700 cm$^{-1}$ and 3950 cm$^{-1}$, and through a lens to focus the IR beam to a reference detector, the analytical and reference detectors converting the light intensity to an electrical signal, comparing the signal obtained from the reference detector to the signal from the analytical detector, determining the presence or absence of barrier polymers from the comparison of the signals by sending the electrical signals to a computer processor for data analysis, and directing materials of different types to different locations or different material collection bins.

In a fourth and preferred aspect, the present invention is a process for sorting recyclable consumer materials that contain barrier polymers from those that do not, which comprises projecting a beam of IR light from a mid-infrared range (MIR) source which includes radiation at wave numbers within a range between about 3250 to about 3950 cm$^{-1}$ through PET consumer materials, passing a portion of the IR beam reflected from or transmitted through the materials or both through an analytical bandpass filter which passes IR light in a region contained within the range from about 3250 to about 3350 cm$^{-1}$ wherein the absorption of the IR light is responsive to differences between recyclable materials containing barrier polymers and recyclable materials not containing barrier polymers and through a lens to focus the IR beam to an analytical detector, and passing another portion of the IR beam reflected from or transmitted through the materials or both through a reference bandpass filter where the absorption characteristics of the two recyclable materials are substantially the same, such as that between about 3750 cm$^{-1}$ and about 3850 cm$^{-1}$, and through a lens to focus the IR beam to a reference detector, the analytical and reference detectors converting the light intensity to an electrical signal, comparing the signal obtained from the reference detector to the signal from the analytical detector, determining the presence or absence of barrier polymers from the comparison of the signals by sending the electrical signals to a computer processor for data analysis, and directing materials of different types to different locations or different material collection bins.

In each of the various aspects, the present invention can be used for detecting, analyzing, and quantifying the presence of barrier polymers in recyclable consumer materials without sorting the materials. For this use, it is not necessary to include the step of directing materials of different types to different locations or different material collection bins.

BRIEF DESCRIPTION OF THE ACCOMPANYING DRAWINGS

DETAILED DESCRIPTION OF THE INVENTION

Figure 1:
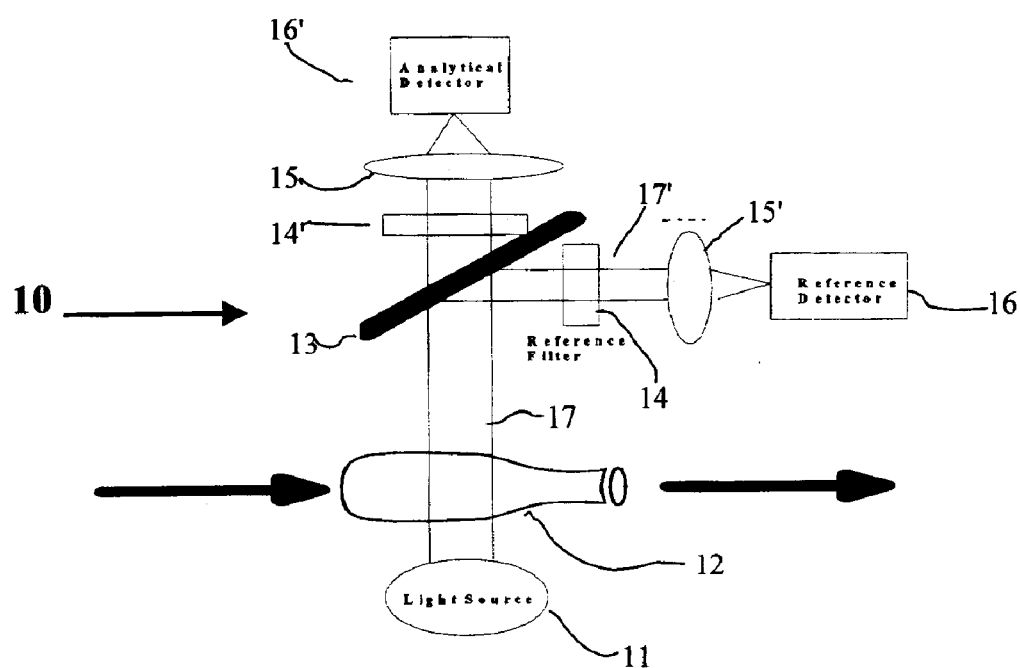
FIG. 1 is a schematic drawing of a preferred embodiment of a detection apparatus in accordance with the present invention.

Suitable means for projecting a beam of IR light onto materials to be analyzed include, for example, tungsten filament lamps, halogen tungsten lamps, Nernst glowers, globars, nichrome wire sources, or carbon wire sources, all of which may be coupled with spherical reflectors with or without gold coating, parabolic reflectors with or without gold coating, fiber optics, or lenses. More preferred are light sources with spherical reflectors with gold coating or light source with parabolic reflectors with gold coating. Most preferred is light source with spherical reflectors with gold coating.

Suitable means for splitting the beam and dispersing the IR light that has reflected from or passed through the materials or both into various wavelengths include, for example, a beam splitter coupled with multiple bandpass filters, a dispersive grating, or other such dispersive element such as a prism. A suitable beam splitter includes a thin film coated beam splitter, a mirror with holes allowing a portion of the light to pass through, or a multi-branched fiber optic. More preferred are a multi-branched fiber optic and multiple bandpass filters. Most preferred is a thin film coated beam splitter with multiple bandpass filters.

Suitable means for measuring the intensity of the JR light at various wavelengths responsive to differences between PET materials and PET materials containing barrier polymers include, for example, InAs, PbS, PbSe, HgCdTe, HgCdZnTe, InSb, IrSi, PtSi, Ge:Zn, Ge:Hg, Ge:Cd, Ge:Cu, Ge:Au, in either individual sensor or arrayed formats. More preferred are InAs, PbS, and PbSe in individual sensor format. Most preferred is InAs in individual sensor format.

Suitable means for measuring the intensity of the IR light at various wavelengths not responsive to differences between PET materials and PET materials containing barrier polymers in order to provide a reference include, for example, InAs, PbS, PbSe, HgCdTe, HgCdZnTe, InSb, Ge:Zn, IrSi, PtSi, in either individual sensor or arrayed formats. More preferred are InAs, PbS, and PbSe in individual sensor format. Most preferred is InAs in individual sensor format.

Suitable means for acquiring and processing the measurements in order to make determinations of materials types include, for example, computerized data acquisition with data acquisition card and algorithms written for a real time operating system, computerized data acquisition with data acquisition card and algorithms written for a real time extension of a non-real time operating system, computerized data acquisition with data acquisition card and algorithms written for a real time operating system running on a secondary processor within the computing system, computerized data acquisition with data acquisition and algorithms performed with a digital signal processor, and analog electronic circuitry. More preferred are computerized data acquisition with data acquisition card and algorithms written for a real time operating system. Most preferred is computerized data acquisition with data acquisition and algorithms performed with a digital signal processor.

Suitable means for responding to such determinations for directing materials of different types to different locations or different material collection bins include, for example, upward ejection with directed air, downward ejection with directed air, open door to divert flow, close door to divert flow, robotic removal. More preferred are upward ejection with directed air and downward ejection with directed air. Most preferred is downward ejection with directed air.

The barrier polymers which can be employed in the practice of the present invention include, for example, thermoplastic and thermoset polymers containing —NH and —OH moieties. These polymers may be applied as co-injected layers, over injected layers or as a coating. Some specific examples of such polymers are, but are not limited to, hydroxy-functionalized polyethers including poly(hydroxyaminoether) (PHAE); ethylene vinyl alcohol (EVOH), polyamides including poly m-xylene adipamide (MXD6), thermoset epoxy coatings.

The hydroxy-functionalized polyethers include (1) poly(hydroxyethers) having repeating units represented by the formula:

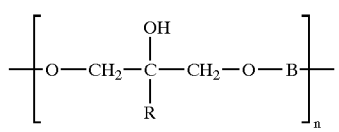

I (2) poly(hydroxy amino ethers) having repeating units represented by the formula: OH

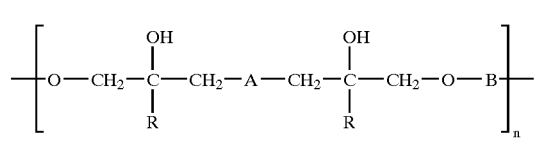

II (3) poly(hydroxy ether sulfonamides) having repeating units represented by the formula.

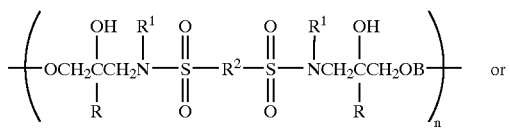

IIIa or

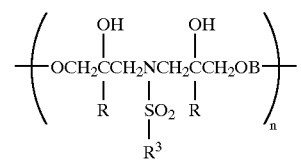

IIIb (4) poly(hydroxy ether sulfides) having repeating units represented by the formula:

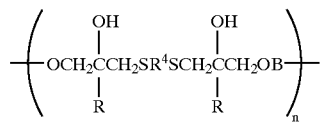

IV (5) poly(hydroxy amide ethers) having repeating units represented independently by any one of the formulas:

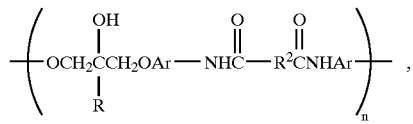

Va

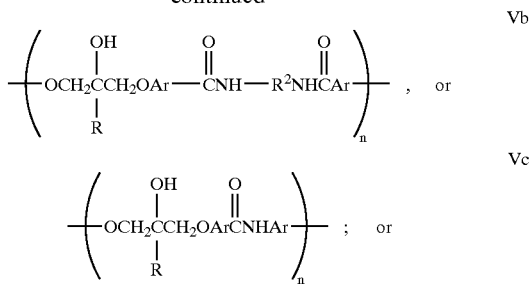

Vb , or

Vc (6) poly(hydroxy amide ethers) having repeating units represented by any one of the formulas:

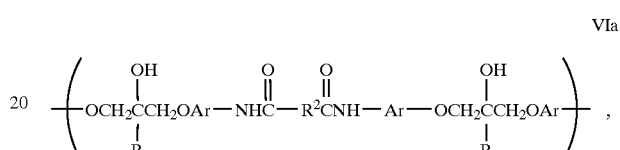

VIa

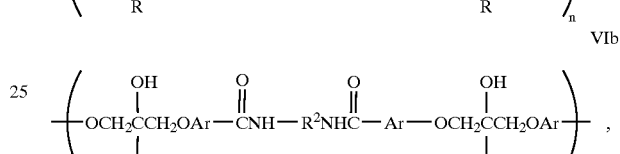

VIb or

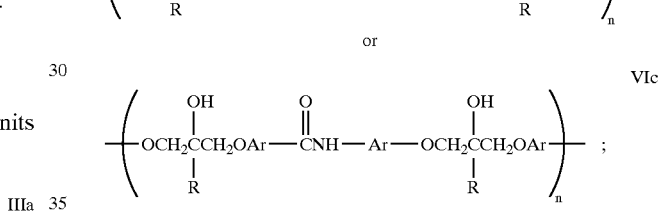

VIc wherein R is alkyl or hydrogen; $R^1$ and $R^3$ are independently a substituted or an unsubstituted alkyl or aryl wherein the substituent(s) is a monovalent moiety which is inert in the reactions used to prepare the hydroxy-functionalized polyethers, such as cyano, halo, amido, hydroxy and hydroxyalkyl; Ar is a divalent aromatic moiety; A is a diamino moiety or a combination of different amine moieties; B, $R^2$, and $R^4$ are independently a divalent organic moiety which is predominantly hydrocarbylene; and n is an integer from about 5 to about 1000.

The term "predominantly hydrocarbylene" means a divalent radical which is predominantly hydrocarbon, but which optionally contains a minor amount of heteroatomic moiety such as oxygen, sulfur, imino, sulfonyl, and sulfoxyl.

In a preferred embodiment of the present invention, R is hydrogen; $R^1$ and $R^3$ are independently methyl, ethyl, propyl, butyl, 2-hydroxyethyl or phenyl; Ar, B, $R^2$ and $R^4$ are independently 1,3-phenylene, 1,4-phenylene, sulfonyldiphenylene, oxydiphenylene, thiodiphenylene or isopropylidenediphenylene; A is 2-hydroxyethylimino, 2-hydroxypropylimino, piperazenyl or N,N'-bis(2-hydroxyethyl)-1,2-ethylenediimino.

The hydroxy-functional polyethers having repeating units represented by Formula I are prepared, for example, by contacting a diglycidyl ether or a combination of diglycidyl ethers with a dihydric phenol or combination of dihydric phenols using the process described in U.S. Pat. No. 5,164,472. Alternatively, the poly(hydroxy ethers) are obtained by allowing a dihydric phenol or a combination of dihydric phenols to react with an epihalohydrin by the process described by Reinking, Barnabeo, and Hale in the *Journal of*

*Applied Polymer Science*, Volume 7, page 2135 (1963). Preferably, the poly(hydroxy ether of Formula I is a poly (hydroxy phenoxyether).

The polyetheramines having repeating units represented by Formula II are prepared by contacting one or more of the diglycidyl ethers of a dihydric phenol with a difunctional amine (an amine having two amine hydrogens) under conditions sufficient to cause the amine moieties to react with epoxy moieties to form a polymer backbone having amine linkages, ether linkages and pendant hydroxyl moieties. These polyetheramines are described in U.S. Pat. No. 5,275,853. The polyetheramines can also be prepared by contacting a diglycidyl ether or an epihalohydrin with a difunctional amine.

The hydroxy-functional poly(ether sulfonamides) having repeating units represented by Formulas IIIa and IIIb are prepared, for example, by polymerizing an N,N-dialkyl or N,N'-diaryldisulfonamide with a diglycidyl ether as described in U.S. Pat. No. 5,149,768.

The hydroxy-functional polyethers having repeating units represented by Formula IV are prepared by reacting a diglycidyl ether and a dithiol as described in U.S. Pat. Nos. 4,048,141 and 4,171,420.

The poly(hydroxy amide ethers) represented by Formula V are prepared by contacting a bis(hydroxyphenylamido) alkane or arene, or a combination of 2 or more of these compounds, such as N,N-bis(3-hydroxyphenyl)adipamide or N,N'-bis(3-hydroxyphenyl)glutaramide, with an epihalohydrin as described in U.S. Pat. No. 5,134,218.

The poly(hydroxy amide ethers) represented by Formula VI are preferably prepared by contacting an N,N'-bis (hydroxyphenylamido)alkane or arene with a diglycidyl ether as described in U.S. Pat. Nos. 5,089,588 and 5,143,998.

The hydroxy-functional polyethers available from Phenoxy Associates, Inc. are also suitable for use as the base polymer in the practice of the present invention. These polymers and the process for preparing them are described in U.S. Pat. Nos. 3,305,528 and 5,401,814.

Ethylene vinyl alcohol (EVOH) is commercially available as Eval™Ô F, a product of Eval Co.

Polyethylene terephthalate (ET) is well known and is commercially available.

The detection system of this invention makes use of the fundamental frequencies in the MIR range of from about 400 to about 4500 $cm^{-1}$. In a preferred embodiment of the invention, InAs detectors are used to measure absorptions of mid-infrared light in the range of from about 2600 to about 4500 $cm^{-1}$.

In a more preferred embodiment of the invention, the mid-infrared light in the regions of from about 3150 to about 3400 $cm^{-1}$ and from about 3700 to about 3950 $cm^{-1}$ is used to detect barrier polymers.

In a most preferred embodiment of the invention, the mid-infrared light in the regions of from about 3250 to about 3350 $cm^{-1}$ and from about 3750 to about 3850 $cm^{-1}$ is used to detect barrier polymers. The polymers containing —NH (such as MXD6) and —OH groups (such as BLOX™, poly (hydroxyaminoethers) commercially available from The Dow Chemical Company, EVOH, and epoxy based coatings) have unique absorption peak in the range of from about 3150 to about 3400 $cm^{-1}$ range while PET does not. PET as well as these barrier polymers does not have significant absorption in the range of from about 3700 to about 3950 $cm^{-1}$ which can be used as a baseline where the response of all the materials is substantially the same. Any such baseline region will suffice. Numerous other regions in the range of from about 2600 to about 4500 $cm^{-1}$ can be used as well, for instance the region of from about 2850 to about 2950 $cm^{-1}$ or the region of from about 3500 to about 3600 $cm^{-1}$ can be used to distinguish PET from the barrier polymers since the barrier polymers are more absorptive than PET in these regions. Most signals in the range of from about 2600 to about 3700 $cm^{-1}$ range can be used to discriminate the materials containing PET and barrier polymers from those containing only PET when referenced with a baseline region such as that in the range of from about 3700 to about 3950 cm−1. Other baselines could also be used, for instance from about 2200 to about 2400 $cm^{-1}$ or from about 4000 to about 4200 $cm^{-1}$.

Referring now to FIG. 1, there is shown detection apparatus 10 comprising mid-infrared (MIR) light source 11, beam dividing device such as a beam splitter and/or bifurcated optical fiber bundle 13, reference bandpass filter 14', analytical bandpass filter 14, light collection optics 15 and 115', analytical detector 16, reference detector 16', and signal processing equipment (not shown). The MIR light source 11 is placed opposite from the beam splitter 13 so that a beam of IR light 17 is directed from the light source to the beam splitter. A stream of articles (such as the bottle depicted) 12 moving in the direction shown at 12' is passed through the beam of light such that the beam of light passes through the articles. FIG. 1 depicts the apparatus operating in the transmission mode where the light beam passes through the article and is collected. In addition, the apparatus may be operated in a reflection mode where light reflected from the article is collected at some angle or in a transflective mode where a reflecting element is placed opposite the source so that a portion of the beam is reflected from the article and is collected by the detection scheme, another portion of the beam transmits through the article, is reflected from the reflection element, transmits through the article again and is collected by the detection scheme. MIR light from the source is divided at beam dividing device 13 which guides a portion of the beam to reference bandpass filter 14' and another portion to the analytical bandpass filter 14. After passing through the bandpass filters, each beam is focused by light collection optics 15 and 15' onto and detected by dedicated indium arsenide (InAs) photo-electric detectors 16 and 16', respectively, where MIR light intensity is converted to an electrical signal. Other detector types responsive to the infrared light could also be used, including mercury cadmium telluride (MCT), lead sulfide, (PbS), lead selenide (PbSe), lead telluride (PbTe) indium antimonide (InSb), deuterated triglycine sulfate (DTGS), germanium cadmium (GeCd), germanium gold (GeAu) and germanium zinc (GeZn). These electrical signals are then sent to a computer processor (not shown) for data analysis. Those trained in the art can use these signals to identify the presence of the barrier polymers.

Figure 2:
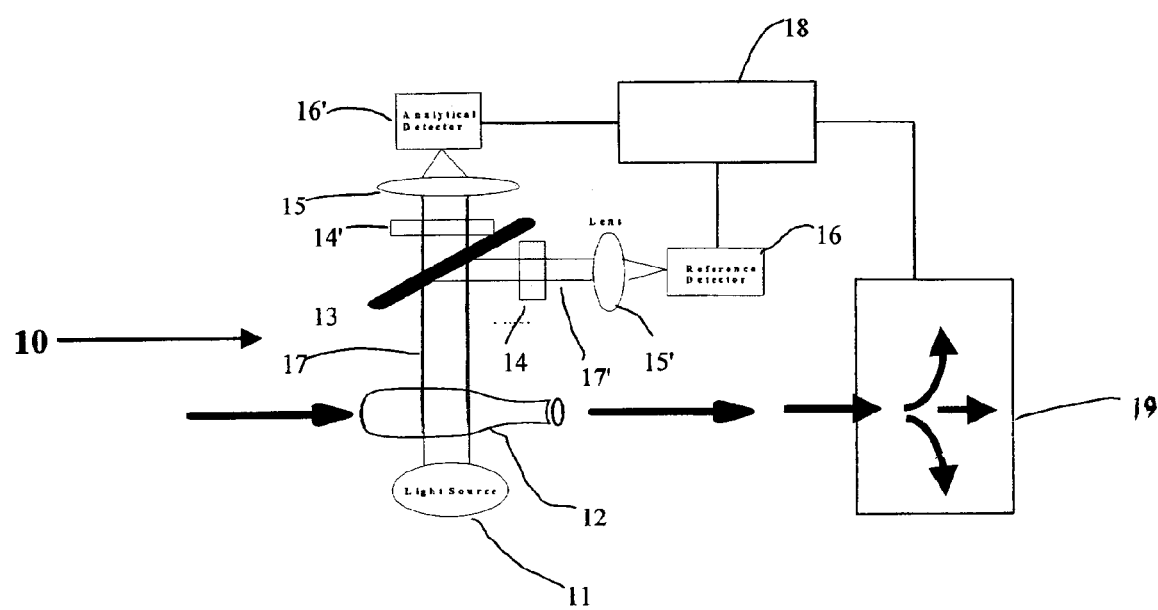
FIG. 2 is a schematic drawing of an apparatus in accordance with the present invention for detection, analyses, and sorting of recyclable consumer materials that contain barrier polymers from those that do not.

A data acquisition and processing device 18 and a sorting device 19 may be added to the detection apparatus 10 as shown in FIG. 2.

Discrimination is possible because of the existence of a hydroxyl and —NH moieties in the barrier materials. Conversely PET does not contain these moieties. The hydroxyl and the amine groups have characteristic fundamental vibrational transitions which will absorb mid-infrared light in the preferred region of from about 3250 to about 3600 $cm^{-1}$. Conversely, PET, which contains no hydroxyl, has no fundamental vibrations which absorb MIR light in this region. Therefore, articles containing barrier materials can be differentiated from PET bottles by monitoring the absorption of MIR light in the preferred region between about 3250 to about 3600 cm$^{-1}$. To account for variations in light source intensity, optical alignment, and the like, a reference spectral region was also selected. In this reference region, preferably between about 3750 to about 3850 cm$^{-1}$, there is no significant absorption of light by either the PET or barrier polymers. A comparison of the signal obtained from the reference region to the signal from the analytical region can be calculated to determine the presence or absence of barrier polymers. Presence of barrier polymers will significantly decrease the intensity of light passed through the analytical bandpass filter thereby discriminating articles containing barrier layers from the PET stream. Electrical signals from the detector will be amplified and sent to a processor which will be programmed with logic to discriminate materials containing barrier layers from PET materials. By interrogating the samples with radiation in the mid-infrared region of the spectrum there are several distinct advantages gained including strong molecular transitions, which allows high signal-to-noise ratio and faster analysis times as well as insensitivity to color present in the sample.

The detection system of this invention can be used in conjunction with commercially available near-infrared sorting equipment or other sorting equipment. This will allow simultaneous MIR and NIR detection and sorting of recycle materials, for instance allowing barrier containing materials and PVC materials to removed from PET materials. Another configuration could couple the MIR detection with color detection to allow sorting of barrier containing materials along with sorting by color.

What is claimed is:

1. An apparatus that makes use of spectral information to distinguish recyclable materials containing barrier polymers from recyclable materials not containing barrier polymers, the apparatus comprising:
   a mid infrared (MIR) light source;
   means for projecting MIR light from the light source onto materials to be analyzed;
   means for dispersing the MIR light that has one or both reflected from and passed through the materials into various wavelengths;
   first means for measuring an analytical intensity of the MIR light within a first wavelength range including at least one wavelength indicative of compositional differences between the materials;
   second means for measuring a reference intensity of the MIR light within a second wavelength range including at least one wavelength not responsive to compositional differences between the materials;
   means for acquiring and comparing measurements from the first and second means for measuring in order to make determinations of materials types; and
   a logic system for determining an amount of materials containing barrier polymers.

2. The apparatus of claim 1 further comprising:
   a beam divider for dividing MIR light from the MIR light source into first and second beams;
   at least one reference bandpass filter for filtering out at least a portion of said first beam; and
   at least one analytical bandpass filter for filtering out at least a portion of said second beam.

3. The apparatus of claim 1 wherein:
   the first wavelength range is between about 3250 cm$^{-1}$ and about 3750 cm$^{-1}$, and wherein the second wavelength range is at least one of a range of between about 2185 cm$^{-1}$ and about 2200 cm$^{-1}$ and a range of between about 3750 cm$^{-1}$ and about 3850 cm$^{-1}$.

4. The apparatus of claim 2 further comprising:
   a sorting system for separating the materials containing barrier polymers from the materials substantially devoid of barrier polymers.

5. The apparatus of claim 3 further comprising:
   a sorting system for separating the materials containing barrier polymers from the materials substantially devoid of barrier polymers.

6. The apparatus of claim 3, wherein:
   the recyclable material comprises polyethylene terephthalate.

7. The apparatus of claim 1 further comprising:
   a sorting system for separating the materials containing, barrier polymers from the materials substantially devoid of barrier polymers.

8. A process of analyzing recyclable materials and distinguishing recyclable materials containing barrier polymers from recyclable materials devoid of barrier polymers, the process comprising the steps of:
   projecting mid infrared (MIR) range light toward recyclable materials;
   separating the light that has at least reflected from or passed through the recyclable materials into at least first and second different wavelength ranges;
   measuring an intensity of the light within the first wavelength range, wherein the intensity of the light at least one wavelength within the first wavelength range is of a first intensity when the recyclable materials include barriers polymers, and wherein the intensity of the light at the at least one wavelength within the first wavelength range is of a second intensity different from said first intensity when the recyclable materials are substantially devoid of barrier polymers;
   providing reference data, wherein the providing step includes measuring an intensity of the light within the second wavelength range, wherein the intensity of the light within the second wavelength range does not vary depending on whether or not the recyclable materials include barrier polymers;
   comparing the measurements in order to identify barrier materials from non-barrier materials; and
   determining an amount of barrier polymers included in the recyclable material that includes such barrier polymers.

9. The process of claim 8 wherein:
   the first wavelength range comprises at least one of a range of between about 2600 cm$^{-1}$ and about 3700 cm$^{-1}$, a range of between about 3150 cm$^{-1}$ and about 3400 cm$^{-1}$, and a range of between about 3250 cm$^{-1}$ and about 3350 cm$^{-1}$.

10. The process of claim 9 wherein:
    the second wavelength range comprises at least one of a range of between about 3700 cm$^{-1}$ and about 3950 cm$^{-1}$ and a range of between about 2185 cm$^{-1}$ and about 2200 cm$^{-1}$.

11. The process of claim 10 further comprising:
    separating recyclable materials that are substantially devoid of barrier polymers from recyclable materials that include barrier polymers.

12. The process of claim 8 wherein:
    the recyclable material comprises polyethylene terephthalate.

13. The process of claim 8 wherein:
    the second wavelength range comprises at least one of a range of between about 3700 cm$^{-1}$ and about 3950 cm$^{-1}$ and a range of between about 2185 cm$^{-1}$ to about 2200 cm$^{-1}$.

14. A process of analyzing recyclable materials and distinguishing recyclable materials containing barrier polymers from recyclable materials devoid of barrier polymers, wherein the recyclable materials comprise at least one of a thermoplastic and a thermoset polymer containing —NH or —OH moieties, the process comprising the steps of:

projecting mid infrared (MIR) range light toward recyclable materials;

separating the light that has at least reflected from or passed through the recyclable materials into at least first and second different wavelength anes;

measuring an intensity of the light within the first wavelength range, wherein the intensity of the light at least one wavelength within the first wavelength range is of a first intensity when the recyclable materials include barriers polymers, and wherein the intensity of the light at the at least one wavelength within the first wavelength range is of a second intensity different from said first intensity when the recyclable materials are substantially devoid of barrier polymers;

providing reference data, wherein the providing step includes measuring an intensity of the light within the second wavelength range, wherein the intensity of the light within the second wavelength range does not vary depending on whether or not the recyclable materials include barrier polymers; and comparing the measurements in order to identify barrier materials from non-barrier materials.

15. The process of claim 14 wherein the recyclable material is selected from the group consisting of: hydroxy-functionalized polyether, ethylene vinyl alcohol, a polyamide, a thermoset epoxy coating, and combinations thereof.

* * * * *